United States Patent
Westerhoff et al.

(10) Patent No.: US 8,548,215 B2
(45) Date of Patent: Oct. 1, 2013

(54) AUTOMATIC IMAGE SEGMENTATION OF A VOLUME BY COMPARING AND CORRELATING SLICE HISTOGRAMS WITH AN ANATOMIC ATLAS OF AVERAGE HISTOGRAMS

(75) Inventors: Malte Westerhoff, Berlin (DE); Detlev Stalling, Berlin (DE); Martin Seebass, Berlin (DE)

(73) Assignee: PME IP Australia Pty Ltd, Richmond (AU)

( * ) Notice: Subject to any disclaimer, the term of this patent is extended or adjusted under 35 U.S.C. 154(b) by 799 days.

(21) Appl. No.: 12/275,862

(22) Filed: Nov. 21, 2008

(65) Prior Publication Data
US 2009/0208082 A1 Aug. 20, 2009

Related U.S. Application Data

(60) Provisional application No. 60/989,915, filed on Nov. 23, 2007.

(51) Int. Cl.
*G06T 1/00* (2006.01)
*G06K 9/34* (2006.01)

(52) U.S. Cl.
USPC .......... 382/131; 382/170; 324/307; 324/309; 378/20

(58) Field of Classification Search
USPC ............... 324/300–322; 382/128–131, 110, 382/154; 600/407–435; 250/252.1, 363.03
See application file for complete search history.

(56) References Cited

U.S. PATENT DOCUMENTS

| | | | | |
|---|---|---|---|---|
| 5,793,879 A * | 8/1998 | Benn et al. | | 382/110 |
| 5,841,140 A * | 11/1998 | McCroskey et al. | | 250/363.03 |
| 6,072,177 A * | 6/2000 | McCroskey et al. | | 250/252.1 |
| 6,104,827 A * | 8/2000 | Benn et al. | | 382/110 |
| 6,249,594 B1 * | 6/2001 | Hibbard | | 382/128 |
| 6,255,655 B1 * | 7/2001 | McCroskey et al. | | 250/363.03 |
| 6,591,004 B1 * | 7/2003 | VanEssen et al. | | 382/154 |
| 6,785,409 B1 | 8/2004 | Suri | | |
| 7,339,585 B2 * | 3/2008 | Verstraelen et al. | | 345/424 |
| 7,701,210 B2 * | 4/2010 | Ichinose | | 324/309 |
| 7,899,516 B2 * | 3/2011 | Chen et al. | | 600/419 |
| 7,956,612 B2 * | 6/2011 | Sorensen | | 324/307 |
| 8,369,600 B2 * | 2/2013 | Can et al. | | 382/133 |
| 2003/0176780 A1 | 9/2003 | Arnold | | |
| 2004/0240753 A1 | 12/2004 | Hu | | |
| 2005/0017972 A1 * | 1/2005 | Poole et al. | | 345/424 |
| 2006/0034511 A1 * | 2/2006 | Verstraelen et al. | | 382/173 |
| 2007/0092864 A1 | 4/2007 | Reinhardt | | |
| 2007/0116332 A1 * | 5/2007 | Cai et al. | | 382/128 |
| 2007/0127802 A1 | 6/2007 | Odry | | |
| 2007/0165917 A1 * | 7/2007 | Cao et al. | | 382/128 |

(Continued)

OTHER PUBLICATIONS

PCT International Search Report and The Written Opinion of the International Searching Authority, dated Jan. 12, 2009, PCT Appl. PCT/US08/84376, filed Nov. 21, 2008.

*Primary Examiner* — Melissa Koval
*Assistant Examiner* — Tiffany Fetzner
(74) *Attorney, Agent, or Firm* — Sci-Law Strategies, PC

(57) ABSTRACT

The invention provides methods and apparatus for image processing that perform image segmentation on data sets in two- and/or three-dimensions so as to resolve structures that have the same or similar grey values (and that would otherwise render with the same or similar intensity values) and that, thereby, facilitate visualization and processing of those data sets.

50 Claims, 8 Drawing Sheets

(56) References Cited

U.S. PATENT DOCUMENTS

| | | | |
|---|---|---|---|
| 2008/0137929 A1* | 6/2008 | Chen et al. | 382/131 |
| 2008/0224700 A1* | 9/2008 | Sorensen | 324/309 |
| 2009/0005693 A1* | 1/2009 | Brauner et al. | 600/481 |
| 2009/0208082 A1* | 8/2009 | Westerhoff et al. | 382/131 |
| 2009/0245610 A1* | 10/2009 | Can et al. | 382/133 |
| 2010/0278405 A1* | 11/2010 | Kakadiaris et al. | 382/131 |
| 2011/0044524 A1* | 2/2011 | Wang et al. | 382/131 |
| 2012/0078088 A1* | 3/2012 | Whitestone et al. | 600/425 |

* cited by examiner

AUTOMATIC IMAGE SEGMENTATION OF A VOLUME BY COMPARING AND CORRELATING SLICE HISTOGRAMS WITH AN ANATOMIC ATLAS OF AVERAGE HISTOGRAMS

This application claims the benefit of priority of U.S. Patent Application Ser. No. 60/989,915, filed Nov. 23, 2007, the teachings of which are incorporated herein by reference.

BACKGROUND OF THE INVENTION

The invention pertains to digital data processing and, more particularly, to the visualization of image data. It has application, by way of non-limiting example, in medical imaging, microscopy, geophysics, non-destructive testing.

Data sets in diagnostic medical imaging and other disciplines such as microscopy, geo-physics, non destructive testing etc., are growing in size and number. Efficient visualization methods are therefore increasingly important to enable clinicians, researchers and others to analyze digital image data. Image segmentation and the extraction of structures from images for visualization and analysis can be helpful for this purpose.

Image segmentation is an automated technique that facilitates distinguishing objects and other features in digital images. The technique can be used, for example, to simplify digitized images so that they can be more readily interpreted by computers (e.g., image analysis software) and/or by their users. Thus, for example, image segmentation can be used to simplify a digitized x-ray image of a patient who has consumed a barium "milkshake." In its original form, such an image is made up of pixels containing a wide range of undifferentiated intensity values that—although, possibly recognizable to the human eye as skeletal bones and digestive tract—are largely uninterpretable by a computer.

Image segmentation can remedy this by categorizing as being of potential interest (e.g., "not background") all pixels of a selected intensity range—typically, all intensities above a threshold value. Alternatively, image segmentation can rely on finding all edges or borders in the image. A related, but still further alternative technique, is to identify all "connected components"—i.e., groupings of adjacent pixels in the image of the same, or similar, pixel intensity (or color). Yet another image segmentation technique involves "region growing," in which connected components are grown around seed point pixels known to reside within structures of interest.

Continuing the example, threshold-based segmentation can be applied to an x-ray image such that pixels whose intensities are above, say, 200 (out of 255) are labelled as barium-containing digestive organs and all other pixels are labelled as background. If the pixel intensities of the former are uniformly adjusted to a common value of, say, 255, and the pixel intensities of the latter are uniformly adjusted to, say, 0, the resulting "segmented" image, with only two levels of intensity values (0 and 255) is often more readily interpreted by man and machine alike.

An object of the invention is to provide improved methods and apparatus for digital data processing.

A related object is to provide such improved methods and apparatus for the visualization of image data.

A still further related aspect of the invention is to provide such methods and apparatus as can be applied in medical imaging, microscopy, geophysics, non destructive testing, and other imaging applications.

SUMMARY OF THE INVENTION

The invention provides methods and apparatus for image processing that perform image segmentation on data sets in two- and/or three-dimensions so as to resolve structures that have the same or similar grey values (and that would otherwise render with the same or similar intensity values) and that, thereby, facilitate visualization and processing of those data sets.

Such methods and apparatus can be used, for example, to apply different visualization parameters or rendering methods to different structures or regions of the data set, including completely hiding one or more those regions. In particular, for example, aspects of the invention provide methods and apparatus for medical imaging that automatically extract bone structures in computed tomography (CT) 3D run-off studies without removing vessel structures (although those vessel structures may have the same or similar grey values). Further aspects of the invention provide for automatic removal of these and/or other structures shown in 3D (and other dimensional) images generated by other medical imaging techniques.

Thus, in one aspect, the invention provides a method for processing one or more two-dimensional (2D) image slices of a three-dimensional (3D) volume. The method includes the steps of identifying a region of the 3D volume to which the 2D image belongs, and performing segmentation on the 2D image to identify connected components. The method further calls for labeling pixels of those connected components based on geometric characteristics (e.g., shape and/or size), where such labeling is based on a volumetric region to which the 2D image belongs. By way of example, methods of the invention can be applied to processing 2D image "slices" generated via computed tomography, e.g., in medical imaging. For these purposes, the "region" is a region of the patient's body.

Related aspects of the invention provide such methods wherein the step of identifying the region to which the 2D image belongs includes computing a histogram of the image and comparing it with one or more other histograms, e.g., from an atlas of average histograms previously determined for the 3D volume (such as, for example, an atlas of average CT histograms for the human body). The image can be assigned, for example, to the region of the 3D volume associated with the best-matching histogram from the atlas. In instances where multiple 2D images are assigned to regions, the method can include checking those assignments for consistency and re-assigning one or more 2D images to another region, as necessary.

Still further related aspects of the invention provide such methods wherein the step of identifying the region to which the 2D image belongs includes determining additional information about the 2D image by performing threshold segmentation and determining therefrom any of (a) a number of connected components in the resulting image and/or (b) a total area occupied by selected structures and/or types of structures (e.g., body tissues). Alternatively, or in addition, the step of determining additional information can include computing a histogram of selected structures (e.g., a histogram of a region within the body and/or a region covered by body tissues).

Other aspects of the invention provide methods as described above in which the step of performing segmentation on the 2D image includes performing a threshold segmentation to label identically pixels representing the structures of interest. When such methods are applied to processing CT images, for example, such structures may be vasculature (e.g., blood vessels) and bone.

Such methods can, according to related aspects of the invention, include identifying connected components in the 2D image, following threshold segmentation, and relabeling pixels as differing types of structures of interest (e.g., vasculature versus bone, and vice versa) based on geometric properties of those connected components, e.g., in the context of the (body) region to which the 2D image has been assigned.

Still further related aspects of the invention provide such methods in which the step of performing segmentation on the 2D image to identify and label connected components based on their geometric characteristics includes performing such segmentation with increasingly larger thresholds to identify connected components that separate, as a result, into multiple components. When this is detected, the method calls for relabeling as differing types of structures of interest (again, by way of example, vasculature versus bone, and vice versa) making up those separated components.

Still further aspects of the invention provide methods as described above that include performing segmentation on a 3D data set formed from the plurality of the 2D images so as to label voxels representing the structures of interest (e.g., vasculature versus bone). According to these aspects of the invention, such segmentation can include flood-filling the 3D data set from one or more seed points placed at voxels in such structures of interest.

Flood-filling can proceed with increasing voxel intensity ranges until a connected component or region created thereby overextends. In related aspects of the invention, flood-filling is terminated when a connected component formed thereby either (i) stair-steps, or (ii) overruns a seed point placed in a voxel representing another structure of interest.

According to still further related aspects of the invention, the method calls for using model-based detection to find structures of interest in the 3D data set. And, yet, in still further related aspects of the invention, pixels corresponding to voxels labeled using such 3D segmentation are not relabeled if and when 2D segmentation of the type described above is performed.

These and other aspects of the invention are evident in the drawings and the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Overview

Figure 1A:
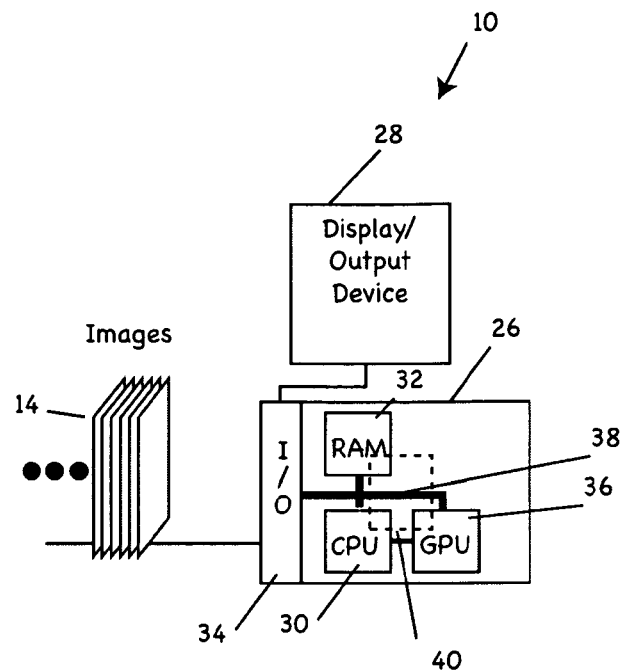
FIG. 1A depicts a digital data processing environment of the type in which the invention is practiced.

Described below are methods and apparatus for image processing according to the invention. These may be realized on workstations, personal computers, and other digital data processing systems of the type known in the art and used for image processing and/or reconstruction, an example of which is provided in FIG. 1A.

The system 10 includes a central processing unit (CPU) 30, dynamic memory (RAM) 32, and I/O section 34, all of the type known in the art, as adapted in accord with the teachings hereof. The digital data processor 26 may be coupled, via I/O section 34, with an image source (not shown), as well as with a monitor or other presentation device 28 on which images processed by system 10 may be displayed. I/O section 34 can also provide coupling to other apparatus (e.g., storage devices) and/or networks to which processed images can be transmitted for storage, displayed or otherwise. Illustrated digital data processor 26 may also include one or more graphical processing units (GPUs) 36, or other hardware acceleration devices, to facilitate execution of the methods described herein, though, such is not a requirement of the invention. Moreover, although digital data processor 26 is shown here has a stand-alone device, in other embodiments, it may be arranged otherwise, e.g., as an embedded processor.

The image source generates or otherwise supplies a plurality of images 14 for segmentation. In the illustrated embodiment, these represent, individually, two-dimensional (2D) "slices" of a three-dimensional (3D) volume. Indeed, in the example discussed below, they represent axial slices of a computed tomography (CT) scan of a patient's body, or portion thereof. More generally, however, images supplied by source 12 may derive from any number of technical pursuits, medical and non-medical alike, such as, by way of non-limiting example, microscopy, geophysics, non destructive testing, and so forth. Furthermore, although referred to as such in the illustrated embodiment, in other embodiments "images" 14 may comprise two-dimensional slices of data of any nature that make up the 3D volume.

Figure 1B:
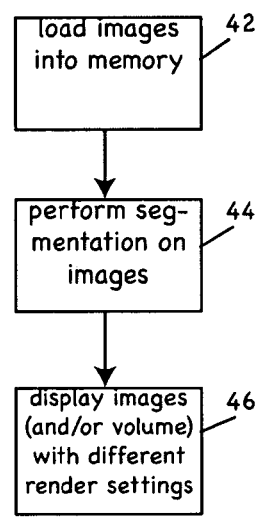
FIG. 1B overviews a method according to the invention.

FIG. 1B overviews operation of the system 10 and, more particularly, of computer software 40 executing thereon for purposes of segmenting images 14. Although such methods according to the invention are implemented in computer software (or, a "computer program") in other embodiments, such apparatus and/or methods may be implemented solely in hardware, in firmware or otherwise.

Referring to the drawing, the system 10 and, more particularly, the software 40 executes the following operations:

First the image data is loaded into main memory 32 of the computer 26. See, step 42. This can be effected all at once or in stages, e.g., as image data from the respective slices is needed for processing. In the illustrated embodiment, that image data comprises the plurality of 2D images 14 that make up a 3D volume (hence, the image data is referred to as a "3D data set"). In other embodiments, processing is performed on only a single individual 2D image.

Then, specific structures represented in the images are segmented, i.e., pixels (and voxels) belonging to those structures are marked (or "labeled") in a suitable data structure in memory 32. See, step 44. In instances where the images 14 are from medical imaging apparatus, the structures can be, for example, anatomical structures. The data structure may comprise any collection of data elements (e.g., an array, struct, linked list, etc.) of the type known in the art (as adopted for use herewith) suitable for holding labels that designate structures to which the pixels and/or voxels belong.

Then the processed image data is displayed, e.g., on output device 28, using different rendering settings for the different structures. See step 46. In other embodiments, the processed image data may be subjected to still further processing on device 26, before, after, or in lieu of display. Alternatively, or in addition, it may be transmitted elsewhere (e.g., to other equipment and/or locations) for storage, processing, and/or display.

Figure 3:
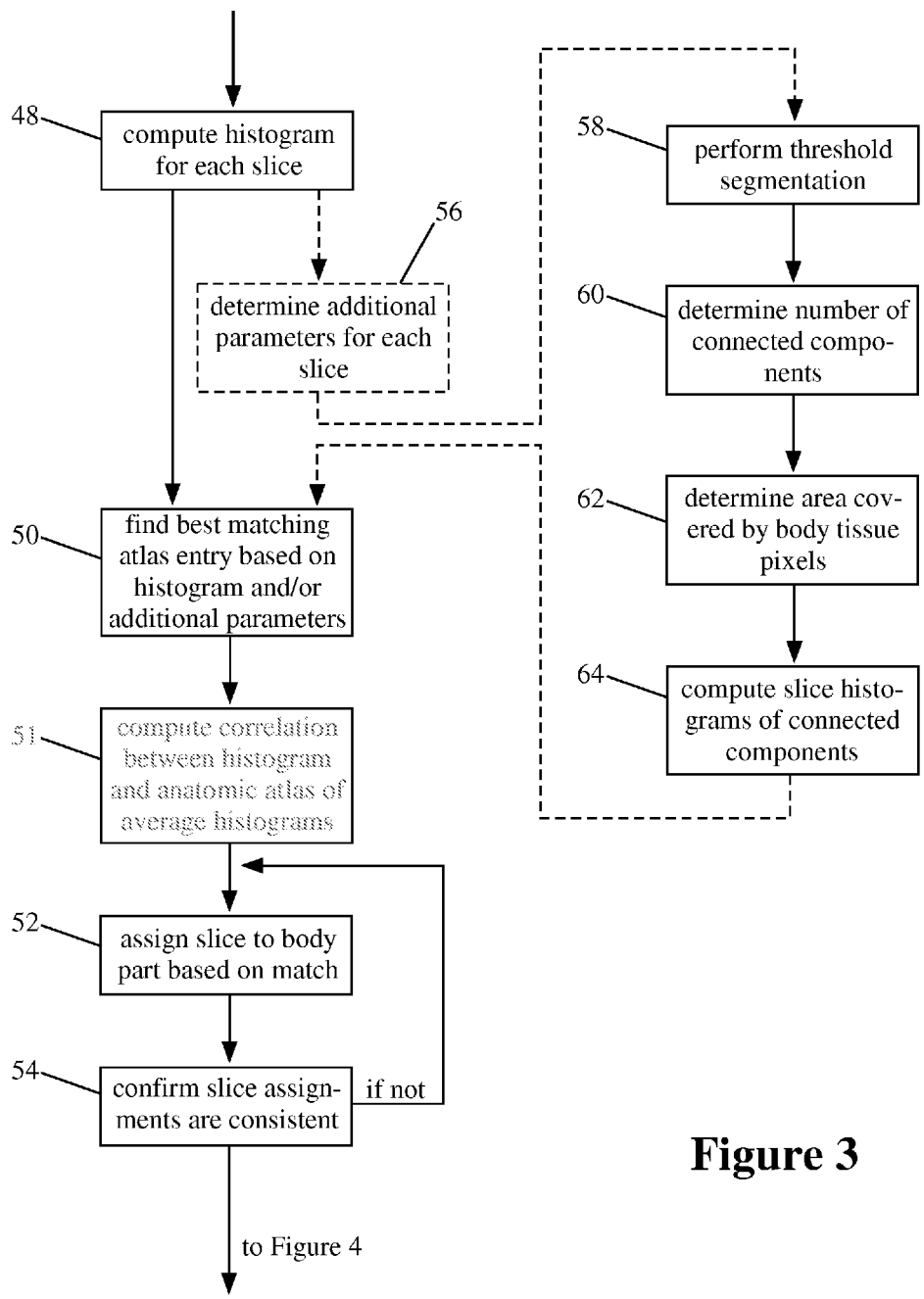
FIG. 3 depicts a method according to the invention for assigning a 2D image slice to a volumetric region.
Figure 4:
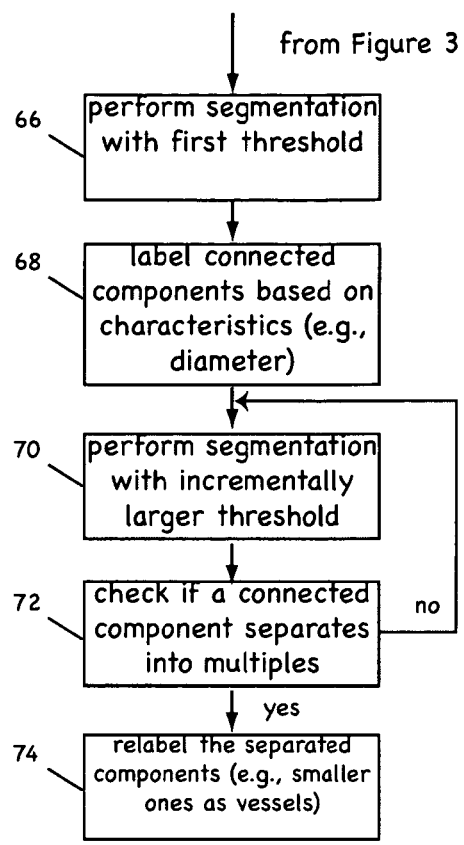
FIG. 4 depicts a method according to the invention for 2D segmentation.
Figure 5:
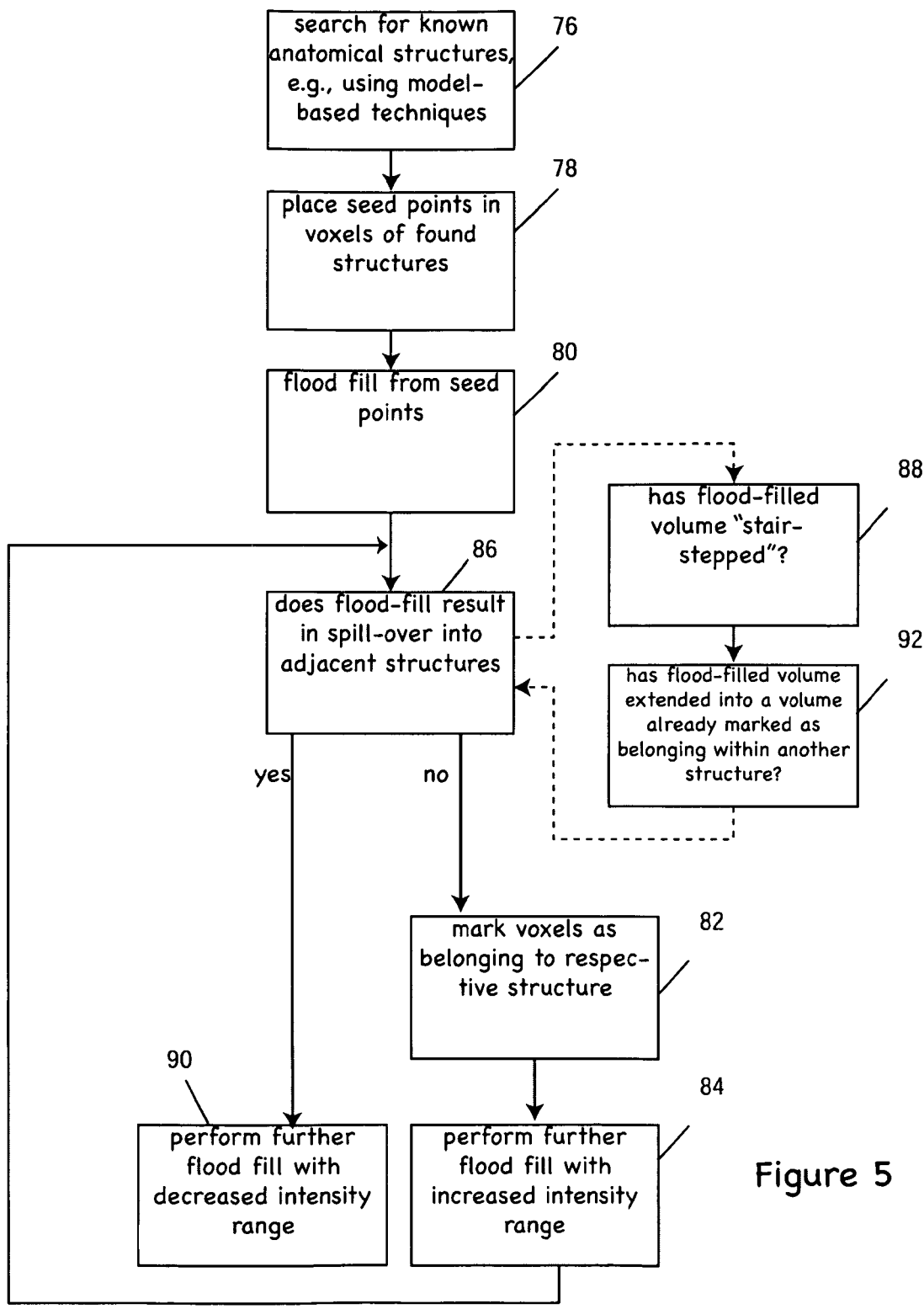
FIG. 5 depicts a method according to the invention for 3D segmentation.

FIGS. 3-5 depict further details of the processing effected in step 44. The discussion of those figures below uses, as an example, segmentation of bone and blood vessels in the images 14, e.g., to enable the former to be removed during display of the segmented images in step 46. However, as noted above, it will be appreciated that the invention can be used for a variety of other purposes and in a variety of other applications.

To understand the example, it will be appreciated that, often, CT studies use contrast agent to visualize the blood vessels. In such cases the blood vessels appear bright in the CT images, similar to bone structures. When rendering the image in maximum intensity projection mode (MIP), then the bright bone structures will often occlude the vessel structures which are typically much thinner than bone. However since both contrasted vessels and bone have the same or similar intensity values, standard rendering methods to distinguish them, such as assigning different transparency values based on intensity, will fail. Apparatus and methods according to the invention resolve this, allowing for the segmentation of structures represented in images 14—i.e., structures that would otherwise render with the same or similar intensity values—so that they may be rendered (and/or processed) differently from one another.

Figure 2:
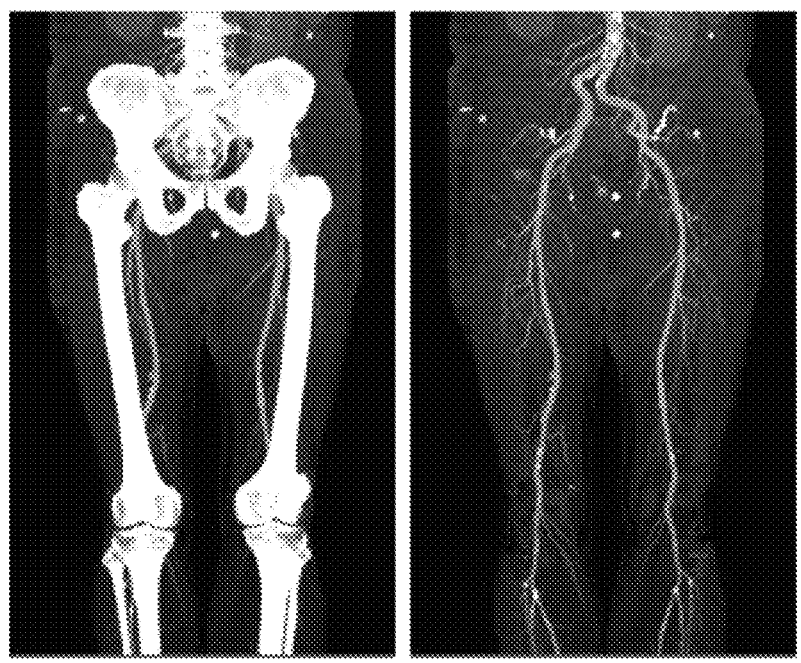
FIG. 2 depicts a result of segmentation of a data set of images utilizing two-dimensional and/or three-dimensional segmentation-based methods according to the invention.

In the example that follows, those methods are applied to segment pixels representing bone differently from those representing blood vessels so that they can be rendered differently and, particularly, so that the bone can be rendered invisibly in step 46. FIG. 2 illustrates the result of executing such a method. In the left hand half of the figure a maximum intensity projection (MIP) of a CT runoff study is shown. Most of the vascular structure is hidden by the bone. In the right hand half of the figure voxels belonging to bone were segmented using methods of the invention and then left out in the rendering, thus, revealing the vessel structure. Note that in the discussion that follows, the images 14 are referred to, individually, as "slices," "2D slices," or the like and, collectively, as the "data set," "3D data set," or the like.

Identifying Body Regions

Referring to FIG. 3, the illustrated method first identifies volumetric regions to which the respective image slices 14 belong. In the example, these are body regions, i.e., ranges of successive slices corresponding to certain anatomy, such as foot, lower leg, knee, upper leg, hip, lower abdomen, lung. This is done as follows:

A histogram is computed for each slice of the data set. See step 48. The histogram is computed in the conventional manner known in the art.

The histograms are then used to determine which volumetric regions the respective slices belong to. In the example, the histograms are compared with an anatomic atlas containing average histograms for the different body regions. See step 50. For each of the slices a correlation such as a cross-correlation is computed between the slice histogram and said atlas of average histograms in order to determine which body part's histogram the slice most closely matches and therefore most likely belongs to. See step 51. The slice is then assigned to the respective body part. See step 52.

Once all (or a subset of all) of the slices have been assigned, then it is checked whether the individual slice assignment is consistent with the overall volumetric region to which they pertain. In the example, the slice assignments are checked to insure that they are consistent with human anatomy, e.g. in the above example, there can only be one range of slices assigned to each of the body regions such as "lower leg" and the body regions must be ordered in the correct spatial order. See step 54.

If inconsistencies are detected, slices are re-assigned to different volumetric regions—in the example, body regions—to obtain a consistent overall assignment. In many instances, multiple different sets of slices could be chosen for re-assignment in order to achieve overall consistency. Preferably, methods and apparatus according to the invention choose the one which re-assigns the smallest number of slices possible to achieve consistency.

As those skilled in the art will appreciate, additional criteria (or parameters) can be utilized to match slices to atlas entries—or, more generally, to determine which volumetric regions the respective slices belong to. This is illustrated in steps 56-64. Generally speaking, this involves performing a threshold segmentation on each slice and, then, determining (a) the number of connected components in the image and/or (b) the total area occupied by pixels representing structures and/or types of structures of interest (in the example, body tissues). It may also involve computing a second histogram for the latter, i.e., structures of interest (e.g., pixels within the body).

More particularly, by way of example, in the illustrated embodiment additional parameters for processing axial slices of a CT scan, e.g., for segmentation of bone and blood vessels, can be computed in a manner such as the following:

A threshold segmentation is performed in each slice with a threshold of −1000 HU (Hounsfield Units) which separates body tissue from air. See step 58. The number of connected components in the threshold segmented image is computed, as well as the total area covered by body pixels. See steps 60-62. A second histogram (subsequently referred to as Body Histogram) is computed for each slice which only takes into account pixels inside the body, i.e., enclosed in a connected component in said threshold segmented image. See step 64. It will be appreciated that, in some applications, the threshold used to separate body tissue from air may vary (e.g., from about −1000 HU to other values) and that, in other embodiments, still other thresholds are used, e.g., to distinguish among other structures and/or types of structures of interest.

The additional information determined for each slice following threshold segmentation (in step 58)—namely, the number of connected components, the total area occupied by structures of interest (e.g., body tissue), and/or a histogram of those structures—can be used along with (or instead of) the slice histogram computed in step 48, to determine volumetric regions (e.g., body regions) to which the respective image slices 14 belong.

In the example, the additional information is used to assign slices to body regions and/or anatomical structures using criteria such as, for example, "slices which have a significant number (>25%) of air pixels (pixels with intensity<−1000 HU) are assigned to lung" or "the number of connected components in slices in region lower leg is two" or "the knee region is between 2 cm and 20 cm in size". Adding such criteria can make the illustrated method and apparatus more robust and/or more efficient. The exact selection of criteria is application- and image-set dependent: for example a criterion like "the number of connected components in slices in region lower leg is two" should not be chosen if one-legged patient data are to be processed.

Performing Segmentation in Slices

Once the slices have been assigned to volumetric regions (in the example, body regions), 2D segmentation is performed to identify connected components of potential interest (bone and vessel) and their pixels labelled (or categorized)

based on geometric characteristics. In the example, this differentiates pixels depicting bone from blood vessels, though, in other applications it may differentiate pixels depicting other structures from one another. In that light, it will be appreciated that some of the algorithms discussed below are specific to bone/vessel segmentation and that different algorithms and/or thresholds may be employed in different applications. Moreover, even in the context of bone/vessel segmentation, the algorithms may vary within different regions of the body as will be described in the following.

In each slice, a threshold segmentation is performed using a first threshold. See step 66. A value is chosen so as to result in identical labeling of pixels representing the structures of interest (in the example, bones and blood vessels), yet, different labeling for structures that are not of interest (e.g., organs). In the example, this is a threshold of 130 HU—though it will be appreciated that different threshold values (e.g., those of about 130 HU or otherwise) can be used depending on the acquisition protocol and user input. As noted, this segmentation will label both, bone and vessels.

In the next step, connected components in each slice are (re-)labelled based on their geometries characteristics (e.g., size and/or shape). This labeling is preferably done in the context of the volumetric region to which the respective slice is assigned. See step 68. Bones normally have a greater diameter than vessels. Therefore, in the example, after said threshold segmentation all connected components with an area greater than the diameter of the largest vessel which can occur in the respective body region is assigned to bone, all others are assigned to vessel. As noted, this may be further qualified by the context of the body region to which the slice is assigned. Thus, In the leg, except for the knee region, one can add the additional constraint that only the largest connected component (upper leg) or the two largest connected components (lower leg) are to be considered bone. Caution is required when cases are to be processed in certain applications were pathologies are present which could violate those latter criteria, such as patients with bone fractures.

Figure 6:
FIGS. 6-8 depict a melding and segregation of structures in an image subject to 2D segmentation according to the invention.
Figure 7:
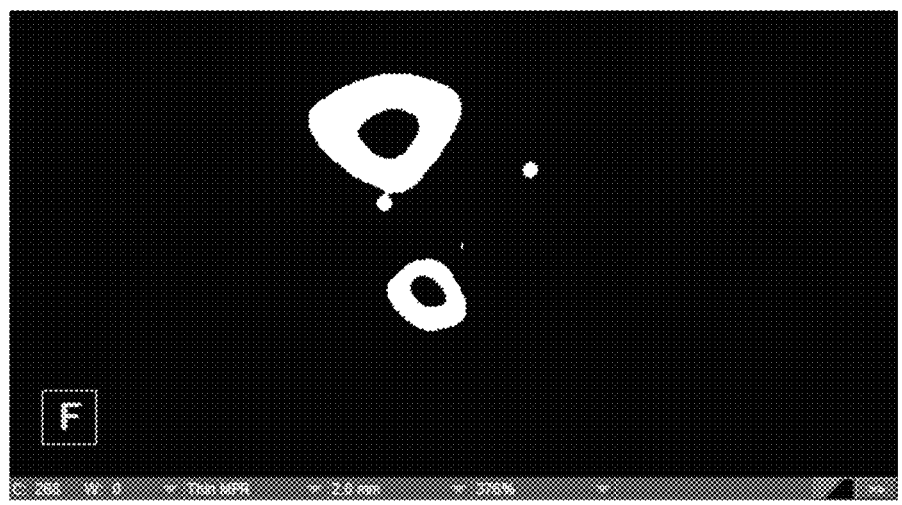

Sometimes the structures that will ultimately be differentiated (in the example, bones and blood vessels) run very close to one another. In such cases, in some slices the cross section of one structure (e.g., the bone) and of another structure (e.g., the vessel) near it may actually appear melted into one connected component in the threshold segmentation generated in step 66. This is illustrated in FIG. 6, which shows part of an axial slice in the lower leg. The two bones and some vessels can be clearly seen as bright spots. FIG. 7 shows a threshold segmentation with a certain threshold (268 HU). As can be seen, one vessel which runs close to the upper bone appears to be connected in this segmentation. Therefore if the whole connected component was selected as bone, then that piece of the vessel would be segmented incorrectly.

Figure 8:
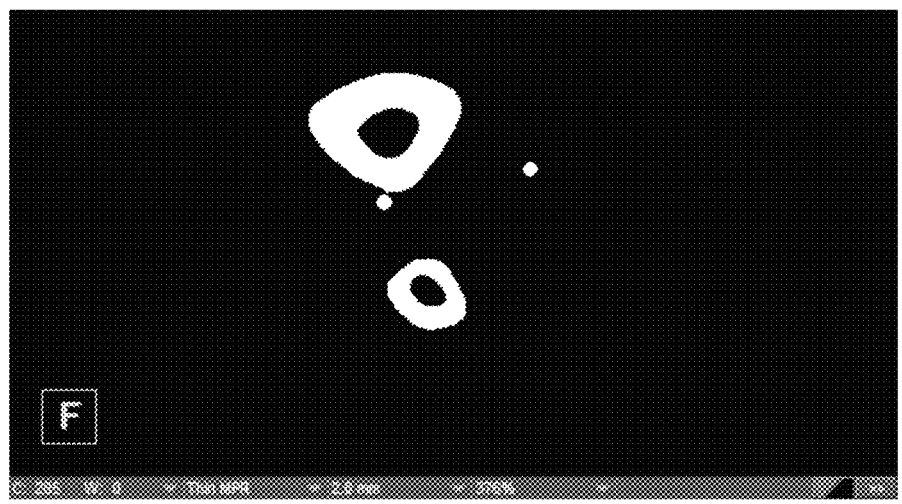

The method used to prevent that is illustrated in steps 70-74 and involves performing segmentation with increasingly larger thresholds, checking after each successive segmentation to see if another otherwise seemingly connected component separates into multiple components and, if so, relabeling the separated components as different structures. Application of this to the example follows:

Assume that a connected component is identified as bone in one slice. We will refer to (and label) the set of pixels comprising this component as B. Now the threshold is increased from the first or original threshold—in this case, 130 HU—in steps of 1 HU up to 400 HU. See step 70. Of course, it will be appreciated that other step sizes may be used. When increasing the threshold, the segmented bone structure shrinks. Often, in the case of a melted vessel/bone structure, the vessel will separate in the course of this process. This can be seen in FIGS. 7 and 8. While in FIG. 7 the vessel and the upper bone are still connected, in FIG. 8 with a higher threshold, they are separated.

After each increase of the threshold it is checked whether a connected component previously identified as bone gets separated into multiple components, a large one and one and a small one. See step 72. Once that happens, the smaller component is labelled as vessel. See step 74. We label the set of pixels comprising said smaller component as V and the set of pixels comprising said larger component as B*.

In the original segmentation with the first threshold (here, 130 HU), all pixels belonging to B are now reassigned according to the following criterion: Any pixel which is part of B* remains bone. Any pixel which is part of V is assigned to vessel, i.e. removed from B. Any pixel which is neither part of B* nor V is re-assigned to vessel if it is closer to V than to B*. The distance of a pixel p to a set of pixels S is defined to be the shortest distance between p and any of the pixels belonging to S.

Performing Segmentation in 3D

In addition to (or in lieu of) performing segmentation on the 2D image slices 14 as described above, methods and apparatus according to the invention performs segmentation on 3D data sets formed from those slices utilizing flood-filling (or region growing). This permits labeling voxels representing structures of interest (e.g., those representing bone and blood vessels) and, as a consequence, provides further basis for differentially labeling the corresponding voxels (and pixels).

By way of overview, this 3D segmentation involves placing seed points in voxels which are known to represent structures of interest and flood-filling from those seed points to mark connected components belonging to the same respective structures. The voxel intensity range for the flood-fill is gradually increased until the connected components—in this case, regions or volumes—formed thereby stair-step or over-run seed points for other structures.

An advantage of 3D segmentation (used alone or in connection with 2D segmentation) is that it can take advantage of structures that are more readily identifiable in 3D (i.e., across multiple slices) than in individual 2D slices. For example, in the abdominal and lung region, blood vessels like the aorta may have diameters larger than some of the thinner bone structures. While the procedures discussed in the preceding section might therefore result in the aorta being marked as vasculature, and vice versa, use of 3D segmentation in accord herewith circumvents the problem.

Therefore in the illustrated embodiment the above described 2D method is extended as follows using a three dimensional approach: Seed points are placed in voxels which are known to be either bone or vessel. Then from these seed points a flood fill is started to mark connected voxels belonging to the same structure. Measures are taken to avoid the flood fill from "spilling over" from vessel into bone structures or vice versa.

In the example this is implemented as follows: Anatomic structures in the pelvic and abdomen region are searched which can be easily found with model based detection methods. See, step 76. For example the aorta is a tubular structure with a known diameter range, always rather centered and always located in front of the spine structure. Also the pelvis bone can be located by searching in the pelvic region for the largest 3D-connected component.

Once those components are identified, seed points can be placed into these objects. See, step 78.

Then from these seed-points a flood-fill algorithm is started. See, step 80. The flood-fill first uses a very conservative intensity range meaning that only voxels with an intensity very similar to the seed points are marked. See step 82. Then, the range is grown to fill/mark more voxels belonging to the same anatomic structure. See, step 84. If the range was made too wide, the flood-fill could erroneously spread out into a spatially close structure. This is the reverse process of the above described melting/separation problem for vessels running near bones. For example with a seed point placed in the aorta, the flood fill could spill over into the spine if the range was chosen such that those two structures would meld. This must be avoided. To do so, step 86 is executed and a number of criteria are evaluated while growing the intensity range.

(i) If the volume filled by the flood fill stair steps, when continuously increasing the range, then it must be assumed that the flood-fill has spilled over and the range is reduced again. See, steps 88 and 90.

(ii) If the flood fill reaches a voxel which is marked as a seed point for a different structure then also it must be assumed that the range is too wide and the range is reduced again. See, steps 90 and 92. For example if a flood fill is started at a seedpoint in the aorta and it reaches a point marked bone in the pelvis, then the range was obviously chosen such that the vessel tree and the bones are connected relative to this range. Therefore this range must be rejected and narrowed.

Any voxels which are marked by the above method can be marked bone or vessel respectively, depending on which seed point they were connected to (or grown from). The pixels correspond to such voxels do not need to be re-labeled when this method is combined with the slice based segmentation described above.

Following segmentation of a data set of images 14 utilizing two-dimensional and/or three-dimensional segmentation in the manner discussed above, the data set (and/or individual images 14 contained therein) can be displayed on output device 28. Different rendering settings can be set for the structures labelled by such segmentation, e.g., to facilitate visualization. For example, as shown on the right side of FIG. 2 and discussed above, voxels labelled as bone can be rendered invisibly, while voxels labelled as blood vessels can be rendered in MIP mode. Of course, other display settings can be used instead, e.g., with blood vessels rendered in one color and bone in another color, and so forth. Moreover, as noted above, the data set may be subjected to still further processing on device 26, before, after, or in lieu of display. Alternatively, or in addition, it may transmitted elsewhere (e.g., to other equipment and/or locations) for storage, processing, and/or display.

The embodiments described herein meet the objects set forth above, among others. Thus, those skilled in the art will appreciate that the illustrated embodiment merely comprises an example of the invention and that other embodiments making changes thereto fall within the scope of the invention, of which

We claim:

1. A method for processing a plurality of two-dimensional (2D) image slices of a three-dimensional (3D) volume comprising, for each of the plurality of 2D image slices:
   (a) selecting a 2D image slice from the plurality of 2D image slices using a digital data processing system for image processing;
   (b) computing a histogram for the 2D image slice;
   (c) comparing the histogram with an anatomic atlas of average histograms including computing a correlation between the histogram and the anatomic atlas of average histograms;
   (d) assigning the 2D image slice to a volumetric region of the 3D volume based on the comparison;
   (e) performing segmentation on the 2D image slice to identify one or more connected components; and
   (f) labeling one or more pixels of one or more connected components on the 2D image slice using the digital data processing system.

2. The method of claim 1, where the labelling is based on one or both geometric characteristics of the one or more connected components and the volumetric region of the 3D volume to which the 2D image slice belongs.

3. The method of claim 2, where the geometric property is a shape and/or a size.

4. The method of claim 1, where the anatomic atlas of average histograms are previously determined for the 3D volume.

5. The method of claim 4, where the anatomic atlas of average histograms include an anatomic atlas of average CT histograms for the human body.

6. The method of claim 1, where step (c) involves computing a correlation between the histogram and a region associated with the best-matching histogram from the anatomic atlas of average histograms.

7. The method of claim 6, further comprising responding to inconsistency in assignment of a plurality of 2D images to regions by re-assigning one or more 2D images to another region.

8. The method of claim 1, where computing a correlation includes computing a cross correlation between the histogram and the anatomic atlas of average histograms.

9. The method of claim 1, further comprising:
   (g) performing a threshold segmentation on the 2D image slice;
   (h) determining one or more connected components based on the results of the threshold segmentation, where the one or more connected components can be used to calculate a number of connected components; and
   (i) using the number of connected components to determine a volumetric region to which the 2D image belongs.

10. The method of claim 9, where if the number of connected components is 2, then the 2D image is assigned to a region with two connections such as the lower leg region.

11. The method of claim 9, further comprising relabeling pixels in the 2D image slice as differing types of structures based on geometric properties of those connected components.

12. The method of claim 9, where step (g) comprises performing segmentation of the 2D image slice with one or more increasingly larger thresholds to identify connected components that separate into multiple components.

13. The method of claim 1, further comprising:
   (g) performing a threshold segmentation on the 2D image;
   (h) determining a total area occupied by a selected structure based on the results of the threshold segmentation; and
   (i) using the total area occupied by the selected structure to determine a volumetric region to which the 2D image belongs.

14. The method of claim 13, where if the volume is between 2 cm and 20 cm, then the 2D image can be assigned to a region of size between 2 cm and 20 cm such as the knee region.

15. The method of claim 13, further comprising relabeling pixels in the 2D image slice as differing types of structures based on geometric properties of those connected components.

16. The method of claim 13, where step (g) comprises performing segmentation of the 2D image slice with one or more increasingly larger thresholds to identify connected components that separate into multiple components.

17. The method of claim 1, further comprising:
(g) performing a threshold segmentation on the 2D image;
(h) determining a type of structure included in the 2D image based on the results of the threshold segmentation; and
(i) using the type of structure to determine a volumetric region to which the 2D image belongs.

18. The method of claim 17, further comprising relabeling pixels in the 2D image slice as differing types of structures based on geometric properties of those connected components.

19. The method of claim 17, where step (g) comprises performing segmentation of the 2D image slice with one or more increasingly larger thresholds to identify connected components that separate into multiple components.

20. The method of claim 1, further comprising:
(g) computing a histogram of a selected structure within the 2D image; and
(h) using the histogram of the selected structure to determine a volumetric region to which the 2D image belongs.

21. The method of claim 20, further comprising relabeling pixels in the 2D image slice as differing types of structures based on geometric properties of those connected components.

22. The method of claim 20, where step (g) comprises performing segmentation of the 2D image slice with one or more increasingly larger thresholds to identify connected components that separate into multiple components as a consequence of such threshold increase.

23. The method of claim 1, further comprising:
(g) computing a histogram of a type of structure within the 2D image; and
(h) using the histogram of the type of structure to determine a volumetric region to which the 2D image belongs.

24. The method of claim 1, where the step of computing a correlation between the histogram and the anatomic atlas of average histograms can further comprise:
(g) performing a threshold segmentation on the 2D image;
(h) determining one or more connected components based on the results of the threshold segmentation;
(i) determining the area covered by body tissue pixels based on the threshold segmentation; and
(j) computing one or more histograms of the one or more connected components.

25. The method of claim 24, where step (g) comprises performing segmentation of the 2D image slice with one or more increasingly larger thresholds to identify connected components that separate into multiple components.

26. The method of claim 24, further comprising relabeling pixels in the 2D image slice as differing types of structures based on geometric properties of those connected components.

27. The method of claim 1, further comprising:
(g) using the digital data processing system to display the plurality of 2D image slices to represent the 3D volume; and
(h) labeling one or more connected components within the 3D volume based on the one or more labeled pixels.

28. A method for processing a plurality of two-dimensional (2D) image slices of a three-dimensional (3D) volume comprising, for each of the plurality of 2D image slices:
(a) selecting one 2D image slice from the plurality of 2D image slices using a digital data processing system for image processing;
(b) computing a histogram for the 2D image slice;
(c) comparing the histogram with an anatomic atlas of average histograms including computing a correlation between the histogram and the anatomic atlas of average histograms;
(d) assigning the 2D image slice to a volumetric region of the 3D volume based on the comparison;
(e) performing segmentation on the 2D image slice to identify one or more connected components;
(f) labeling one or more pixels of one or more connected components based on one or both of:
one or more geometric characteristics of the one or more connected components and
the volumetric region to which the 2D image slice belongs;
(g) using the digital data processing system to display the plurality of 2D image slices to represent the 3D volume; and
(h) labeling one or more connected components within the 3D volume based on the one or more labeled pixels.

29. The method of claim 28, where the labelling is based on one or both geometric characteristics of the one or more connected components and the volumetric region of the 3D volume to which the 2D image slice belongs.

30. The method of claim 28, where the anatomic atlas of average histograms are previously determined for the 3D volume.

31. The method of claim 30, where the anatomic atlas of average histograms correspond with an anatomic atlas of average CT histograms for the human body.

32. The method of claim 28, where step (c) involves assigning as the region of the 3D volume to which the 2D image slice belongs, a region associated with the anatomic atlas of average histograms to which the histogram best compares.

33. The method of claim 32, where the image is assigned to the region of the 3D volume associated with the best-matching histogram from the anatomic atlas of average histograms.

34. The method of claim 32, further comprising responding to inconsistency in assignment of a plurality of 2D images to regions by re-assigning one or more 2D images to another region.

35. The method of claim 28, further comprising:
(g) performing a threshold segmentation on the 2D image slice;
(h) determining one or more connected components based on the results of the threshold segmentation, where the one or more connected components can be used to calculate a number of connected components; and
(i) using the number of connected components to determine a volumetric region to which the 2D image belongs.

36. The method of claim 35, where if the number of connected components is 2, then the 2D image is assigned to a region with two connections such as the lower leg region.

37. The method of claim 35, further comprising relabeling pixels in the 2D image slice as differing types of structures based on geometric properties of those connected components.

38. The method of claim 28, further comprising:
(g) performing a threshold segmentation on the 2D image;
(h) determining a total area occupied by a selected structure based on the results of the threshold segmentation; and (i) using the total area occupied by the selected structure to determine a volumetric region to which the 2D image belongs.

39. The method of claim 38, where if the volume is between 2 cm and 20 cm, then the 2D image can be assigned to a region of size between 2 cm and 20 cm such as the knee region.

40. The method of claim 38, further comprising relabeling pixels in the 2D image slice as differing types of structures based on geometric properties of those connected components.

41. The method of claim 24, further comprising:
    (g) performing a threshold segmentation on the 2D image;
    (h) determining a type of structure included in the 2D image based on the results of the threshold segmentation; and
    (i) using the type of structure to determine a volumetric region to which the 2D image belongs.

42. The method of claim 41, where if the 2D image includes a significant number of air pixels, then the 2D image can be assigned to a region with a significant number of air cells such as the lung region.

43. The method of claim 41, further comprising relabeling pixels in the 2D image slice as differing types of structures based on geometric properties of those connected components.

44. The method of claim 28, further comprising:
    (g) computing a histogram of a selected structure within the 2D image; and
    (h) using the histogram of the selected structure to determine a volumetric region to which the 2D image belongs.

45. The method of claim 44, further comprising relabeling pixels in the 2D image slice as differing types of structures based on geometric properties of those connected components.

46. The method of claim 28, further comprising:
    (e) computing a histogram of a type of structure within the 2D image; and
    (f) using the additional information to determine a volumetric region to which the 2D image belongs.

47. The method of claim 46, further comprising relabeling pixels in the 2D image slice as differing types of structures based on geometric properties of those connected components.

48. The method of claim 28, where the step of computing a correlation between the histogram and the anatomic atlas of average histograms can further comprise:
    (g) performing a threshold segmentation on the 2D image;
    (h) determining one or more connected components based on the results of the threshold segmentation;
    (i) determining the area covered by body tissue pixels based on the threshold segmentation; and
    (j) computing one or more histograms of the one or more connected components.

49. The method of claim 48, further comprising relabeling pixels in the 2D image slice as differing types of structures based on geometric properties of those connected components.

50. The method of claim 17, where when the 2D image includes a significant number of air pixels, then the 2D image is assigned to a region with a significant number of air cells such as the lung region.

\* \* \* \* \*